(12) United States Patent
Dieringer et al.

(10) Patent No.: US 10,920,735 B2
(45) Date of Patent: Feb. 16, 2021

(54) METHOD AND DEVICE FOR CONTROLLING AN INTERNAL COMBUSTION ENGINE

(71) Applicant: Robert Bosch GmbH, Stuttgart (DE)

(72) Inventors: Jasmin Dieringer, Stuttgart (DE); Carsten Kluth, Stuttgart (DE); Kai Dierssen, Hohenwettersbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/459,723

(22) Filed: Jul. 2, 2019

(65) Prior Publication Data
US 2020/0018280 A1 Jan. 16, 2020

(30) Foreign Application Priority Data

Jul. 16, 2018 (DE) .......................... 102018211783.7

(51) Int. Cl.
| | |
|---|---|
| *F02P 5/00* | (2006.01) |
| *F02P 5/04* | (2006.01) |
| *F02D 41/22* | (2006.01) |
| *G01L 23/22* | (2006.01) |
| *F02P 5/152* | (2006.01) |

(52) U.S. Cl.
CPC .............. *F02P 5/045* (2013.01); *F02D 41/22* (2013.01); *G01L 23/221* (2013.01); *F02D 2041/224* (2013.01); *F02P 5/152* (2013.01)

(58) Field of Classification Search
CPC ...... F02P 5/00; F02P 5/04; F02P 5/152; F02P 5/1521; F02P 5/1522; F02P 5/1526; F02P 5/1527; F02P 5/16; F02P 5/14; F02P 5/15

USPC .............. 123/406.23, 406.24, 406.29, 406.3, 123/406.32, 406.33, 406.34, 406.35, 123/406.37
See application file for complete search history.

(56) References Cited

U.S. PATENT DOCUMENTS

| | | | | |
|---|---|---|---|---|
| 10,018,085 B2* | 7/2018 | Birkigt | ............. | F02P 5/152 |
| 2007/0157903 A1* | 7/2007 | Zurlo | ............. | F02P 5/1527 123/406.3 |
| 2008/0228341 A1* | 9/2008 | Orifij | ............. | G01M 15/12 701/31.4 |
| 2008/0306672 A1* | 12/2008 | Bauer | ............. | F02D 41/3035 701/102 |
| 2011/0132332 A1* | 6/2011 | Caretta | ............. | F02D 41/2451 123/486 |
| 2011/0315101 A1* | 12/2011 | Cleary | ............. | F02D 41/006 123/90.15 |

(Continued)

FOREIGN PATENT DOCUMENTS

| | | |
|---|---|---|
| DE | 4001477 A1 | 8/1991 |
| DE | 10043700 | 3/2002 |

(Continued)

*Primary Examiner* — John Kwon
(74) *Attorney, Agent, or Firm* — Norton Rose Fulbright US LLP; Gerard Messina

(57) ABSTRACT

A method and a device are provided for controlling an internal combustion engine, a knock sensor being provided for acquiring combustion signals of the internal combustion engine. Devices are also provided that, during running operation of the internal combustion engine, select operating ranges of the internal combustion engine that are suitable for a determination of fuel quality, and carry out a determination of the fuel quality in these ranges on the basis of signals of the knock sensor.

10 Claims, 2 Drawing Sheets

(56) References Cited

U.S. PATENT DOCUMENTS

| | | | |
|---|---|---|---|
| 2013/0060447 A1* | 3/2013 | Guerrassi | F02D 35/025 |
| | | | 701/102 |
| 2015/0260111 A1* | 9/2015 | Maeda | F02P 5/04 |
| | | | 123/295 |
| 2016/0208764 A1* | 7/2016 | Mann | F02P 5/152 |
| 2019/0257256 A1* | 8/2019 | Stenl S | F02D 41/0097 |

FOREIGN PATENT DOCUMENTS

| | | |
|---|---|---|
| DE | 102007060937 A1 | 6/2009 |
| EP | 1775584 A2 | 4/2007 |

\* cited by examiner

METHOD AND DEVICE FOR CONTROLLING AN INTERNAL COMBUSTION ENGINE

CROSS REFERENCE

The present application claims the benefit under 35 U.S.C. § 119 of German Patent Application No. DE 102018211783.7 filed on Jul. 16, 2018, which is expressly incorporated herein by reference in its entirety.

FIELD

The present invention is based on a method and a device for controlling an internal combustion engine.

BACKGROUND INFORMATION

German Patent Application No. DE 40 01 477 A1 describes a method and a device for controlling an internal combustion engine in which a knock sensor is also provided. The knock sensor ascertains knock signals of all the cylinders, and, as necessary, when knocking occurs the ignition angle is displaced in the direction of a later ignition. The ignition angle adjustment is evaluated over all cylinders and all operating ranges in which knocking may occur, and on the basis of this evaluation a general adjustment of the ignition angle can take place. This general adjustment is referred to as long-term adaptation, and can be an indication of the quality of the fuel.

SUMMARY

An example method according to the present invention, and an example device according to the present invention may have the advantage that only selected operating ranges of the internal combustion engine are selected for the determination of the fuel quality, and a determination of the fuel quality then takes place in these ranges on the basis of signals of the knock sensor. Through the selection of suitable operating ranges, the determination of the fuel quality takes place with a high degree of accuracy, and in this way it can be ensured that the determination of the fuel quality is highly reliable. In this way the quality of the regulation of the internal combustion engine is improved, thus achieving both improved fuel consumption and advantages with regard to the lifespan of the internal combustion engine.

Advantageous developments and improvements may result from the features described herein. Because not all cylinders of a multi-cylinder internal combustion engine are suitable for learning fuel quality, the most suitable ones are used for learning the fuel quality. In addition, only suitable load and rotational speed ranges are used for learning the fuel quality. The suitable operating ranges are suitable in particular for learning the fuel quality if they have been realized for a specified time duration during driving operation. In this way, the precision of the learning of the fuel quality can be improved. An ignition angle of the knock regulation system is particularly suitable for learning the fuel quality. Through this value, the quality of the combustion processes in the internal combustion engine is evaluated over a large number of combustion processes. Here, a comparison with at least one threshold value takes place in a particularly simple manner. In particular, the length of time for which the ignition angle adjustment of the knock regulation in the selected operating ranges exceeds the threshold value can also be taken into account. In this way, the precision of the learning of the fuel quality is improved, and in particular it can be ensured that small variations of the ignition angle adjustment around the threshold value do not cause a variation of the learned fuel quality. This evaluation can be done particularly simply if the time duration for which the ignition angle adjustment is over the threshold value is evaluated using a counter that is incremented whenever the ignition angle adjustment exceeds the threshold value and is decremented when the threshold value is not exceeded. The quality of the fuel is then to be recognized only when this counter is in a specified state. As a function of the fuel quality, measures can then be taken to influence the internal combustion engine in order to prevent damage or operational impairment due to poor fuel quality. In particular, it can be provided to limit the maximum torque of the internal combustion engine.

BRIEF DESCRIPTION OF THE DRAWINGS

Exemplary embodiments of the present invention are shown in the figures and are explained in more detail in the description below.

DETAILED DESCRIPTION OF EXAMPLE EMBODIMENTS

Figure 1:
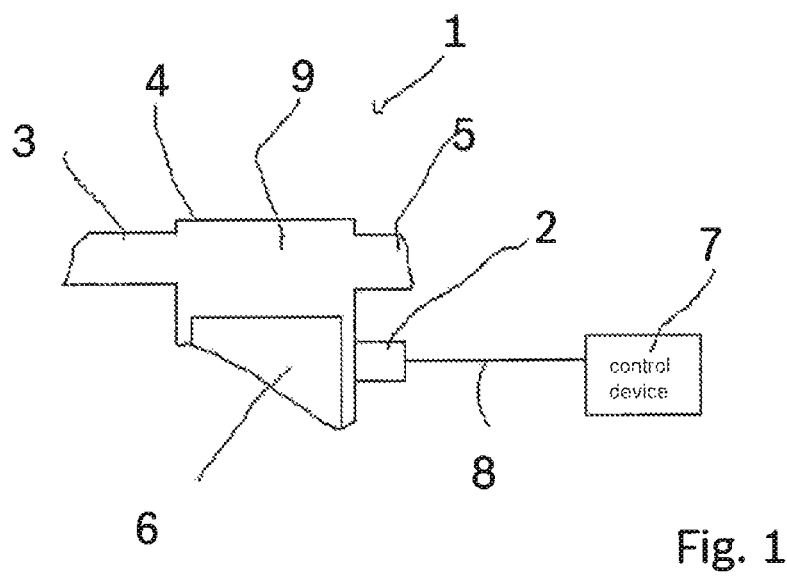
FIG. 1 shows an internal combustion engine having a knock sensor.

In FIG. 1, an internal combustion engine 1 having a knock sensor 2 is shown schematically. Internal combustion engine 1 has a cylinder 4 and a piston 6 situated in cylinder 4. Cylinder 4 and piston 6 form a combustion chamber 9 in which a mixture of air and fuel is placed. Through an ignition spark at a spark plug (not shown), the mixture of air and fuel in combustion chamber 9 is ignited and causes an increase in pressure in combustion chamber 9 that causes a movement of piston 6. The movement of piston 6 is then converted into a rotational movement of the internal combustion engine via a rod (not shown) and a crankshaft (not shown). For the supply of air, an intake manifold 3 is provided, and an exhaust manifold 5 is provided for conducting away the exhaust gas. Not shown are corresponding valves for controlling an intake of air through intake manifold 3 and for controlling a discharge of exhaust gas through exhaust manifold 5. In addition, injection devices for firing the fuel into combustion chamber 9 are not shown. Internal combustion engine 1 of FIG. 1 is thus a standard spark-ignition gasoline engine, generally conventional to those skilled in the art in the area of internal combustion engines.

On the outside of cylinder 4, a knock sensor 2 is attached that detects vibration signals or acoustic signals of the combustion in combustion chamber 9. The signals detected in this way by combustion chamber 2 of the combustion in combustion chamber 9 are forwarded, through a data line 8, to a control device 7 for further evaluation. If necessary, a preprocessing of the acoustic signals of the combustion in combustion chamber 9 can also take place immediately in knock sensor 2. Through the signals of knock sensor 2, in particular knock signals, i.e. impermissibly occurring combustions in combustion chamber 9, can in particular be recognized by control device 7. Such knocking combustions result in pressure and temperature peaks in combustion chamber 9 that can cause damage to internal combustion engine 1. Therefore, a knock regulation system is provided that recognizes such knocking combustions and takes measures to prevent knocking combustions. A very fast-acting measure is to influence the ignition angle, i.e., the angle relative to the position of the crankshaft at which the mixture in combustion chamber 9 is ignited by a spark plug. The earlier relative to the crankshaft angle a combustion takes place in combustion chamber 9, the more efficiently the energy released in the combustion is converted into mechanical work of the internal combustion engine. Unfortunately, when there is an early ignition angle the risk of knocking combustion also increases. Therefore, a later adjustment of the ignition angle relative to the position of the crankshaft, or relative to the top dead center of piston 6 in cylinder 4, can suppress a knocking combustion. However, the later the ignition angle is controlled to be, the lower the efficiency of internal combustion engine 1. Therefore, a knock regulation system regulates the ignition angle to a value at which internal combustion engine 1 is operated as efficiently as possible without the occurrence of knocking. The precise ignition angle here is a function of operating parameters of internal combustion engine 1, in particular load and rotational speed. In addition, the tendency to knock of the internal combustion engine is a function of the quality of the fuel. The tendency to knock of a combustion engine 1 can therefore be used to determine fuel quality.

According to the present invention, the signals of knock sensor 2 are used to determine the quality of the fuel used for combustion in combustion chamber 9. It has turned out that it is not appropriate to use the ignition angle set by the knock regulation system in every operating range. In addition, in a multi-cylinder internal combustion engine not every cylinder is equally well-suited for ascertaining the fuel quality. In an internal combustion engine having a plurality of cylinders, the cylinders differ slightly with regard to their combustion behavior. In particular, some cylinders are more problematic with regard to knocking behavior, and are therefore particularly well-suited for ascertaining the fuel quality on the basis of a signal of knock sensor 2. For each internal combustion engine, given an application of a multi-cylinder engine, only some cylinders may thus be selected to be used for the determination of the fuel quality on the basis of signals of knock sensor 2.

In addition, not all load and rotational speed ranges of an internal combustion engine 1 are equally suitable for learning the fuel quality. Of course, ranges are unsuitable in which no knocking at all can occur, because in these ranges no knowledge can be expected to be gained about fuel quality through knock regulation. These are typically ranges of low rotational speed and low power. But the ranges in which knocking can occur are also not equally well-suited for learning the fuel quality. In an application, i.e., a determination of the operating parameters used by control device 7 for learning the fuel quality, the ranges of the load and rotational speed are therefore to be ascertained that are then used to learn the fuel quality.

In addition, the determination of the fuel quality preferably takes place in ranges that are used for an adequately long time duration during real operation of the internal combustion engine. So that the fuel quality can be determined from the signals of fuel sensor 2, the signal of knock sensor 2 must be operated for an adequately long time in the relevant operating range of the internal combustion engine. Only then is a stable operating state reached, on the basis of the signals of the knock sensor, that is suitable for determining the fuel quality. Short-term fluctuations of the operating conditions, for example changes in load and rotational speed, have to be suppressed so that these fluctuations will not influence the determination of the fuel quality.

A parameter that is particularly suitable for determining the fuel quality is the ignition angle set by the knock regulation system. If the internal combustion engine is operated for a sufficiently long time in a suitable operating range, then in a cylinder suitable for determining the fuel quality the ignition angle adjustment of the knock regulating system will settle down such that the ignition angle will be precisely at the boundary of operation that is as efficient as possible while still being knock-free. Such an ignition angle, or such an ignition angle adjustment of the knock regulation system, is therefore immediately a measure of the knock tendency of the fuel, i.e. the quality of the fuel.

An evaluation of this ignition angle adjustment is done particularly simply by comparing the ignition angle adjustment to a threshold value. If the ignition angle adjustment exceeds a specified threshold value, this is an indication of a particular tendency to knock of the fuel, or the fuel quality. However, for a knock regulation system it is typical for the ignition angle adjustment to be constantly varied in order to recognize the boundary of knock-free operation. If a threshold value for the fuel quality were to be constantly exceeded due to this variation of the ignition angle or due to changes in the load or rotational speed, then a different fuel quality would be recognized relatively frequently during operation of the internal combustion engine. In order to avoid this, it can therefore be provided to additionally evaluate how long the ignition angle adjustment of the knock regulation system exceeds the threshold values in the selected operating ranges. Such a time determination can take place in particular again by using a counter, the counter being incremented or decremented as a function of whether the ignition angle adjustment exceeds the threshold value or not. A change in the fuel quality is recognized only when this counter value exceeds a specified counter state.

If, based on the evaluation of the signals of knock sensor 2, a change of the fuel quality is then planned, then a maximum torque of the internal combustion engine can be set as a function of the fuel quality. In particular, this limitation is required if a very poor-quality fuel is used, because, in particular in ranges in which the internal combustion engine is supposed to provide a particularly high torque, knocking can then can occur more frequently, damaging internal combustion engine 1.

Figure 2A:
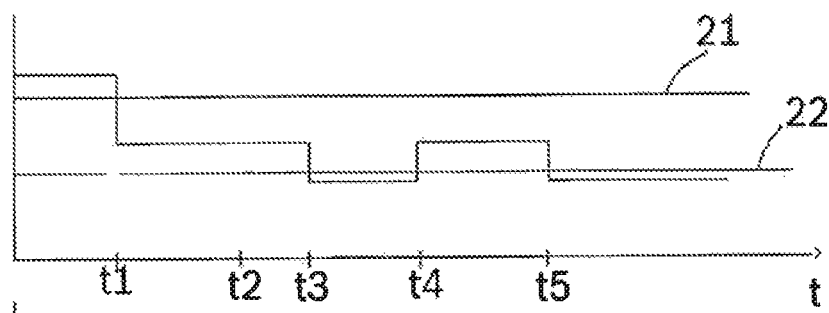
FIG. 2A shows the ignition angle adjustment plotted over time.
Figure 2B:
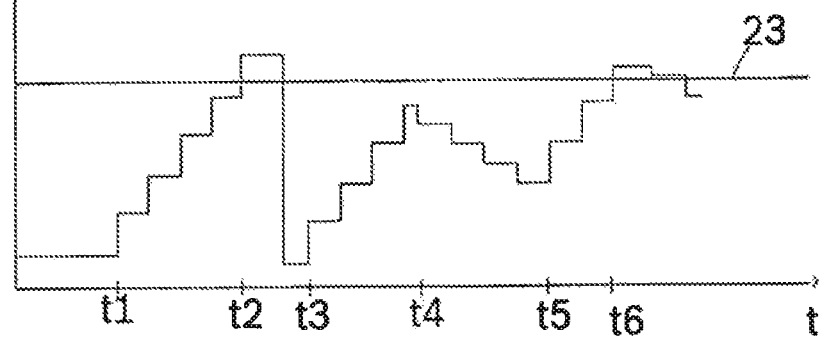
FIG. 2B shows an influencing of a counter, plotted over time.
Figure 2C:
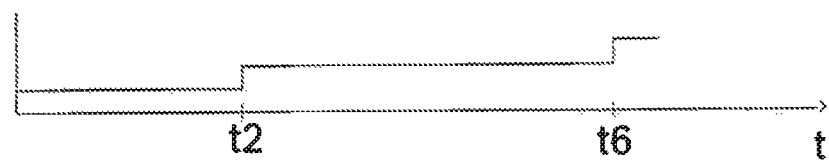
FIG. 2C shows fuel quality plotted over time.

FIGS. 2A-2C again show details of the ignition angle adjustment of the knock regulation system, the counter used, and the fuel quality. FIG. 2A shows the ignition angle adjustment of the knock regulation system plotted over time t. In addition, two threshold values 21 and 22 are shown for the ignition angle adjustment of the knock regulation adjustment. FIG. 2B shows a counter state of a counter that is incremented and decremented as a function of whether the ignition angle adjustment of the knock regulation system exceeds or falls below threshold values 21, 22. FIG. 2C then shows an indicator for the fuel quality that is changed whenever the counter of FIG. 2b exceeds counter state 23.

FIG. 2A shows an ignition angle adjustment of the knock regulation system plotted over time t. At time t1, the ignition angle adjustment is reduced, and threshold value 21 is fallen below. This reduction of the ignition angle adjustment is a reaction to a knocking event, and the ignition angle therefore has to be influenced in the direction of a later ignition. Because the ignition angle adjustment in FIG. 2A is below threshold value 21, the counter whose state is shown in FIG. 2B also begins to count upward. Therefore, at time t1 there also takes place an incrementing of the counter state, as shown in FIG. 2B. After time t1, the ignition angle adjustment of FIG. 2A stays constant for a certain time duration below threshold value 21, so that the counter is incremented far upward until, at time t2, it exceeds a specified counter state 23. At time t2, an influencing of the fuel quality therefore also takes place, as is shown in FIG. 2C. At time t2, the fuel quality jumps from a previously low value to a higher value, this higher value indicating that the knocking tendency of the fuel has increased, i.e., that the fuel quality has become worse. The value shown in FIG. 2C indicates the fuel quality, a higher value in FIG. 2C indicating a worse fuel quality, i.e. a greater knock tendency of the fuel. After time t2, the value of the counter in FIG. 2B is reset to an initial value.

At time t3, the ignition angle adjustment of FIG. 2A then falls below a further, lower threshold 22. Starting from this time t3, the counter of FIG. 2B is then incremented, as is shown in FIG. 2B for the time span between t3 and t4. At time t4, the ignition angle adjustment then again exceeds the further threshold 22 (i.e., the ignition angle is adjusted in the direction of an earlier ignition), and subsequently the counter state is decremented until time t5, as is shown in FIG. 2B in time span t4-t5. Here it is also notable that the incrementing of the counter in FIG. 2B takes place with a larger step width than does the decrementing of the counter in the time span t4 to t5. This is one way in which the counter can be realized. Alternatively, it is also possible for the incrementing and decrementing to take place with the same speed, or for the decrementing to take place faster than the incrementing.

At time t5, the ignition angle adjustment of FIG. 2A again exceeds threshold value 22, and the counter in FIG. 2B is once again incremented. At time t6, the counter in FIG. 2B again exceeds counter state 23, and in FIG. 2C at time t6 the fuel quality is once again reset to a value for a poorer-quality fuel.

The procedure described in FIGS. 2A-2C ensure that it is not the case that every ignition angle adjustment brings about a change in the fuel quality immediately when a threshold value is exceeded, but rather only when the threshold value is exceeded for a certain time duration. In this way, an excessively fast changing of the value for the fuel quality every time there is a change in the ignition angle adjustment is avoided.

Threshold values 21, 22 shown in FIG. 2A are of course a function of the operating range in which the internal combustion engine is operated. It is either possible to provide separate thresholds 21, 22 for each operating range, in particular for each range of load and operating speed, or else the thresholds are made comparable through a norming between the individual operating ranges of the load and rotational speed. Ignition angle adjustments in various ranges for load and operating speed that were previously selected as admissible ranges for the determination of the fuel quality can then in particular be used for the determination of the fuel quality. In addition, results of different cylinders can be made comparable to one another through conversion, so that the results of different cylinders can also be used to determine fuel quality.

What is claimed is:

1. A method for controlling an internal combustion engine, a knock sensor being provided for acquiring combustion signals of the internal combustion engine, the method comprising:
   selecting, during running operation of the internal combustion engine, a particular one or more of a plurality of operating ranges of the internal combustion engine that are suitable for determining fuel quality; and
   based on the selection, determining a fuel quality on the basis of signals of the knock sensor occurring in the selected operating ranges.

2. The method as recited in claim 1, wherein:
   the internal combustion engine includes a plurality of cylinders;
   the method further includes selecting, as suitable for the determining of the fuel quality, a subset of the cylinders, from which at least one of the plurality of cylinders is excluded; and
   based on the selection of the subset of the cylinders:
      the determining of the fuel quality is based on the signals of the knock sensor occurring in the subset of the cylinders; and
      information of the knock sensor regarding the at least one of the plurality of cylinders that is excluded from the subset is disregarded in the determining of the fuel quality.

3. The method as recited in claim 1, wherein:
   the method further includes selecting, as suitable for the determining of the fuel quality, a subset of a plurality of load and rotational speed regions, from which at least one of the plurality of load and rotational speed regions is excluded; and
   based on the selection of the subset of the load and rotational speed regions:
      the determining of the fuel quality is based on the signals of the knock sensor occurring in the load and rotational speed regions; and
      information of the knock sensor regarding the at least one of the plurality of load and rotational speed regions that is excluded from the subset is disregarded in the determining of the fuel quality.

4. The method as recited in claim 1, wherein:
   the method further includes, for each of a plurality of operating ranges, determining whether the respective operating range has been realized for a predefined length of time during driving operation; and
   the selecting of the particular one or more of the plurality of operating ranges as suitable for determining the fuel quality includes selecting those of the plurality of operating ranges that have been determined to have been realized for the predefined length of time during the driving operation, so that information of the knock sensor regarding those of the plurality of operating ranges that have not been realized for the predefined length of time is disregarded in the determining of the fuel quality.

5. The method as recited in claim 1, wherein the determining of the fuel quality is performed based on an ignition angle adjustment of a knock regulation system.

6. The method as recited in claim 1, wherein the determining of the fuel quality is performed based on a comparison of an ignition angle adjustment of a knock regulation system in the selected operating ranges to a threshold value.

7. The method as recited in claim 6, wherein for determining the fuel quality, it is determined how long the ignition angle adjustment of the knock regulation system exceeds the threshold value in the selected operating ranges.

8. The method as recited in claim 7, wherein:
   the method further includes, when the ignition angle adjustment exceeds the threshold value, incrementing a counter, and, when the ignition angle adjustment does not exceed the threshold value, decrementing a counter; and the determining of the fuel quality includes recognizing a worsening of the fuel quality based on the counter exceeding a specified counter state.

9. The method as recited in claim 1, further comprising setting a maximum torque of the internal combustion engine as a function of the fuel quality.

10. A device for controlling an internal combustion engine, a knock sensor being provided for acquiring combustion signals of the internal combustion engine, the device comprising:
- a control device configured to:
    - select, during running operation of the internal combustion engine, a particular one or more of a plurality of operating ranges of the internal combustion engine suitable for a determination of fuel quality; and
    - based on the selection, carry out a determination of the fuel quality on the basis of signals of the knock sensor occurring in the selected operating ranges.

* * * * *